US011422876B2

(12) United States Patent
Shuey et al.

(10) Patent No.: US 11,422,876 B2
(45) Date of Patent: Aug. 23, 2022

(54) SYSTEMS AND METHODS FOR MONITORING AND RESPONDING TO BUS BIT ERROR RATIO EVENTS

(71) Applicant: Microsoft Technology Licensing, LLC, Redmond, WA (US)

(72) Inventors: Jeffrey Matthew Shuey, Bothell, WA (US); Neeraj Ladkani, Bothell, WA (US); Tao Liu, Bellevue, WA (US); Subhasish Chakraborty, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 441 days.

(21) Appl. No.: 16/530,844

(22) Filed: Aug. 2, 2019

(65) Prior Publication Data
US 2021/0034445 A1   Feb. 4, 2021

(51) Int. Cl.
*G06F 11/00* (2006.01)
*G06F 11/07* (2006.01)
*G06F 9/48* (2006.01)
*G06F 9/50* (2006.01)
*G06F 11/10* (2006.01)
(Continued)

(52) U.S. Cl.
CPC .......... *G06F 11/076* (2013.01); *G06F 9/4856* (2013.01); *G06F 9/505* (2013.01); *G06F 9/5088* (2013.01); *G06F 11/0793* (2013.01); *G06F 11/1048* (2013.01); *G06F 11/1625* (2013.01); *G06F 11/3027* (2013.01)

(58) Field of Classification Search
CPC .............. G06F 11/076; G06F 11/0793; G06F 11/1048; G06F 11/1625; G06F 11/3027
See application file for complete search history.

(56) References Cited

U.S. PATENT DOCUMENTS

| | | | |
|---|---|---|---|
| 6,438,717 | B1 | 8/2002 | Butler et al. |
| 6,480,809 | B1 | 11/2002 | Slaight |
| 7,353,431 | B2 | 4/2008 | Lopez et al. |

(Continued)

FOREIGN PATENT DOCUMENTS

| | | |
|---|---|---|
| GB | 2403039 A | 12/2004 |
| GB | 2403315 A | 12/2004 |

OTHER PUBLICATIONS

"International Search Report and Written Opinion Issued in PCT Application No. PCT/US20/036545", dated Aug. 21, 2020, 18 Pages.

(Continued)

*Primary Examiner* — Charles Ehne
(74) *Attorney, Agent, or Firm* — Ray Quinney & Nebeker; Tiffany Healy (57) ABSTRACT

A computer system includes a bus interface having error correction capability. The bus interface includes an error register that is configured to provide error information related to correctable errors. System software within the computer system is configured to obtain the error information from the error register and calculate a bit error metric based on the error information. A baseboard management controller within the computer system is configured to take an action in response to obtaining the bit error metric from the system software and determining that a condition related to the bit error metric has been satisfied.

18 Claims, 7 Drawing Sheets

(51) Int. Cl.
 *G06F 11/16* (2006.01)
 *G06F 11/30* (2006.01)

(56) References Cited

U.S. PATENT DOCUMENTS

| | | |
|---|---|---|
| 7,386,767 B1 | 6/2008 | Xue et al. |
| 7,428,678 B1 | 9/2008 | Berndt et al. |
| 7,464,307 B2 | 12/2008 | Nejedlo et al. |
| 7,472,318 B2 | 12/2008 | Fan et al. |
| 8,788,890 B2 | 7/2014 | Kim et al. |
| 9,483,340 B1 | 11/2016 | Johnson et al. |
| 2006/0224808 A1 | 10/2006 | Depew et al. |
| 2015/0058665 A1* | 2/2015 | Guo .................... G06F 11/0793 714/10 |
| 2016/0055052 A1* | 2/2016 | Hu ...................... G06F 11/1048 714/799 |
| 2018/0060168 A1* | 3/2018 | Kelly ................ H03M 13/2906 |
| 2019/0180838 A1* | 6/2019 | Li .......................... G11C 29/52 |

OTHER PUBLICATIONS

"Estimation of Bit Error Rate of any digital Communication System", In Master Thesis of Sciences and Technologies of Information and Communication, Dec. 18, 2013, 155 Pages.

\* cited by examiner

SYSTEMS AND METHODS FOR MONITORING AND RESPONDING TO BUS BIT ERROR RATIO EVENTS

CROSS-REFERENCE TO RELATED APPLICATIONS

N/A

BACKGROUND

The present disclosure is generally related to bus interfaces in a computer system. The term "bus interface" refers to any entity or combination of entities that facilitates data transfer between components inside a computer, or between computers. In the context of the techniques disclosed herein, a bus interface may alternatively be referred to as an interconnect. The present disclosure is specifically related to bus interfaces that have the ability to detect error(s) in connection with the transfer of data and correct or retry the transaction(s) that produced the error(s). Some examples of such bus interfaces include Peripheral Component Interconnect Express (PCIe), Ultra Path Interconnect (UPI), Quick Path Interconnect (QPI), XGMI, XGMI2, Ethernet, Serial AT Attachment (SATA), Serial Attached Small Computer System Interface (SAS), and any computer bus that operates using a double data rate (DDR) technique. Of course, the above list of bus interfaces is provided for purposes of example only, and should not be interpreted as limiting the scope of the present disclosure. The techniques disclosed herein may be used in connection with other bus interfaces that are not included in the above list.

Errors may sometimes occur as data is transmitted across bus interfaces. In general terms, errors may be categorized as correctable or uncorrectable. As the name suggests, correctable errors may be corrected. Such errors are typically corrected by hardware and no software intervention is required. Although correctable errors may have an impact on performance (e.g., latency, bandwidth), no data/information is lost and the communication link remains reliable. Uncorrectable errors are the errors that are not able to be corrected, so that data/information is lost.

Some bus interfaces have error detection and correction capabilities. For example, some bus interfaces have error correcting code (ECC), which is a mechanism that enables correction of single-bit errors on the fly. Depending on the architecture, sometimes multi-bit errors can be corrected as well. Generally speaking, however, the higher number of errors, the less likely it is that the errors are correctable. Error correction in a bus interface may involve the retransmission of data. If a receiving device detects an error in data that it has received, the receiving device typically notifies the sending device about the error, and the sending device then resends the data.

Correctable error handling has previously been addressed in several ways. One approach simply involves masking and ignoring the errors. This is not an effective approach, however, because high levels of correctable errors can reduce performance and eventually lead to uncorrectable errors and system crashes.

Another approach involves asynchronous, interrupt-based error handling that logs and clears the errors. In one implementation of this approach, when an error happens a system management interface (SMI) interrupt is generated to the basic input/output system (BIOS). An SMI handler then scans input/output (I/O) registers for error status. For any errors that are found, the SMI handler tells the baseboard management controller (BMC) to log the error occurrence in an event log. However, the error handler can miss errors that are happening faster than the time it takes to run the handler code. In addition, sometimes the logging capacity is limited, in which case a high error rate can fill or overflow the event log. This can prevent the ability to see other useful log information. To prevent this, sometimes logging limits are implemented. In those cases, once the logging limit is reached, then additional errors are simply ignored (which is not a desirable approach, as discussed above). Even if all errors are logged, it is difficult to use the log data from this approach to implement meaningful warnings and to take preemptive actions.

Some systems utilize a periodic interrupt or polling approach that logs and clears the errors. In addition to suffering from many of the same disadvantages discussed previously, this approach generally has a higher latency responding to errors. If this approach is used to handle all error types, then uncorrectable errors may not be handled in time.

Some systems utilize a "leaky bucket" approach in combination with one of the above error handling techniques. With such an approach, errors are logged once they reach a certain quantity. For example, in one implementation, the operating system logs each error and notifies the BIOS when N errors have been seen (where N may be a fairly large number, such as 500). The BIOS then logs one error event to the BMC event log for each N errors seen by the operating system (OS). Although the leaky bucket approach alleviates the problem of filling the BMC event log and helps to provide more actionable events, it suffers from the disadvantage of making it appear as though there are fewer errors than there really have been (because N errors are logged as a single event). Even if one is aware that a single event corresponds to N errors and that no events does not necessarily mean that no errors have occurred, this method still loses granularity in terms of what can be determined from the BMC event log, thereby making it necessary to refer to the OS event log. If the OS for some reason is not able to respond to the errors (as this would be an OS-first approach), there may be no indication that there is an error at all. Also, because the leaky bucket approach is used in combination with one of the above error handling techniques, this approach suffers from the same disadvantages discussed previously.

In view of the foregoing, benefits may be realized by improved techniques for correctable error handling in connection with bus interfaces.

SUMMARY

In accordance with one aspect of the present disclosure, a computer system is disclosed that includes a bus interface having error correction capability and an error register within the bus interface. The error register is configured to provide error information related to correctable errors. The computer system also includes system software that is configured to obtain the error information from the error register and a baseboard management controller (BMC) that is configured to take an action in response to determining that a condition related to a bit error metric has been satisfied. The bit error metric is calculated based on the error information.

The bit error metric may include a ratio of a number of correctable bit errors that have occurred during a time interval to a total number of bits that have been transferred across the bus interface during the time interval.

The error register may be configured to provide an error status of the bus interface. The system software may be configured to run an interrupt service routine in response to an interrupt being generated. The interrupt service routine may be configured to scan the bus interface to determine the error status and increment a counter when the error status indicates that a correctable error has occurred.

The error register may be configured to provide an error counter for the bus interface. The system software may be configured to periodically poll the error register to determine a current value of the error counter.

The system software may be selected from the group consisting of a host operating system of the computer system, a basic input/output system (BIOS), BMC firmware, agent code running on the host operating system, or firmware or another operating system located on an add-in card or other subsystem of the computer system.

The action may include at least one of logging an indication that the condition related to the bit error metric has been satisfied, notifying an entity that the condition related to the bit error metric has been satisfied, or directly supplying the bit error metric to the entity.

Determining that the condition has been satisfied may include determining that the bit error metric does not compare favorably to a threshold value.

A plurality of threshold values may be defined. The BMC may be configured to take a first action in response to determining that the bit error metric does not compare favorably to a first threshold value and take a second action in response to determining that the bit error metric does not compare favorably to a second threshold value. The second action may be different from the first action.

Determining that the condition has been satisfied may include detecting that a statistical parameter related to historical bit error metric values has changed by more than a threshold amount within a defined time period.

Calculating the bit error metric may include calculating a ratio of $(E_{end}-E_{start})/\Delta T$. $E_{start}$ may indicate a first error counter value at a start of a time interval. $E_{end}$ may indicate a second error counter value at an end of the time interval. $\Delta T$ may indicate the total number of bits that have been transferred across the bus interface during the time interval.

In accordance with another aspect of the present disclosure, a baseboard management controller for a computer system is disclosed. The baseboard management controller includes one or more processors, memory in electronic communication with the one or more processors, and instructions stored in the memory. The instructions are executable by the one or more processors to determine that a condition related to a bit error metric has been satisfied. The bit error metric is related to a bus interface within a computer system. The bus interface includes error detection and correction capability. The bit error metric depends on how many correctable bit errors have occurred on the bus interface during a time interval. The instructions are also executable by the one or more processors to take an action in response to determining that the condition has been satisfied.

The bit error metric may include a ratio of a number of correctable bit errors that have occurred during a time interval to a total number of bits that have been transferred across the bus interface during the time interval.

The bit error metric may be obtained from a process that is running within an operating system (OS) or a basic input/output system (BIOS) or generated by the BMC based on error data obtained from the OS or the BIOS.

The action may include recording a current value of the bit error metric in a log or sending a notification message to another entity.

Determining that the condition has been satisfied may include determining that the bit error metric does not compare favorably to a threshold value.

The baseboard management controller may further include additional instructions that are executable by the one or more processors to take a first action in response to determining that the bit error metric does not compare favorably to a first threshold value and take a second action in response to determining that the bit error metric does not compare favorably to a second threshold value. The second action may be different from the first action.

In accordance with another aspect of the present disclosure, a computer-implemented method is disclosed that includes receiving a notification related to a bit error metric for a bus interface within a computer system. The bus interface includes error correction capability. The bit error metric depends on how many correctable bit errors have occurred on the bus interface during a time interval. The method also includes determining, based on the notification, that a condition related to the bit error metric has been satisfied. The method also includes taking an action in response to determining that the condition has been satisfied.

The condition may include a migration condition indicating that the computer system is likely to experience a system crash. The computer system may include a workload. The action may include causing the workload to be migrated to a different computer system.

Determining that the condition has been satisfied may include interpreting the notification as an indication that the migration condition has been satisfied.

The notification may include the bit error metric. Determining that the condition has been satisfied may include determining that the bit error metric does not compare favorably to a threshold value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The present disclosure proposes the use of a bit error metric in connection with a bus interface in a computer system. The bit error metric may take the form of a bit error rate. In some embodiments, the bit error metric may be defined as a ratio of a number of correctable bit errors that have occurred during a time interval to a total number of bits that have been transferred across the bus interface during the time interval.

Existing device-specific registers that indicate error status and/or count may be used to calculate a bit error metric in accordance with the present disclosure. In this context, the term "register" may refer to a hardware register that may be used to store one or more bits of information. An "error register" may refer to a hardware register that is used to store error information. As an example, a bus interface may include an error register that provides an error status of the bus interface. When a system interrupt is generated, system software (e.g., the BIOS or OS) may run an interrupt service routine that scans the bus interface to determine the error status. A counter may be incremented when the error status indicates that a correctable error has occurred. Alternatively, the bus interface may include an error register that provides an error counter (instead of just an error status). System software may be configured to periodically poll the error register to determine the number of errors that occur over a particular time interval.

The bit error metric may be used in a variety of ways. In general, the bit error metric may be monitored as opposed to monitoring individual correctable error events. This should make it easier to implement meaningful warnings and to take preventative actions with respect to a bus interface in a computer system.

In some embodiments, system software (e.g., the BIOS or OS) may deliver the bit error metric to the BMC or make it available in a location that the BMC can access. Alternatively, instead of obtaining the bit error metric from the system software, the BMC may calculate the bit error metric based on error data that the BMC receives from the system software. For example, the system software may only be designed or capable of indicating one error at a time to the BMC, and the BMC may be configured to keep a count of these reported errors as well as the time interval and the data rate to calculate the bit error metric.

The BMC may be configured to take one or more actions in response to determining that a condition related to the bit error metric has been satisfied. In this context, the term "condition" may refer to one or more defined events, such as the bit error metric exceeding a defined threshold. In this context, a condition is satisfied when the defined event(s) associated with the condition have occurred. The term "action" may refer broadly to any type of activity or operation that is performed. Some specific examples of actions that may be taken in response to determining that a condition related to the bit error metric has been satisfied will be described below, such as notifying one or more other entities that the condition has been satisfied.

Determining that a condition related to the bit error metric has been satisfied may involve, for example, determining that the bit error metric does not compare favorably to a threshold value (e.g., determining that the bit error metric exceeds a threshold value). Actions that may be taken by the BMC include logging an indication that the condition related to the bit error metric has been satisfied, notifying one or more other entities that the condition related to the bit error metric has been satisfied, and directly supplying the bit error metric to one or more other entities. Thus, the BMC may treat the bit error metric like other management sensors and implement thresholds for action.

In some embodiments, conditions may be defined that involve historical information about the bit error metric. For example, a condition may be defined specifying that one or more actions should be taken if a statistical parameter (e.g., mean, standard deviation) related to historical bit error metric values has changed by more than a threshold amount within a defined time period.

Using the bit error metric in the manner described enables preventative actions to be taken with respect to a bus interface in a computer system. For example, trends in bit error metric values may indicate that failure of a particular bus interface is likely to occur fairly soon. In this case, preventative actions may be taken such as moving any workloads that are running on the computer system to another computer system.

In addition to facilitating preventative measures, the techniques disclosed herein may also make analysis of past failures more meaningful. For example, when a computer system crashes due to the failure of a bus interface, logs created in accordance with the techniques disclosed herein may indicate trends in bit error metric values that can be used to predict future failures.

Figure 1:
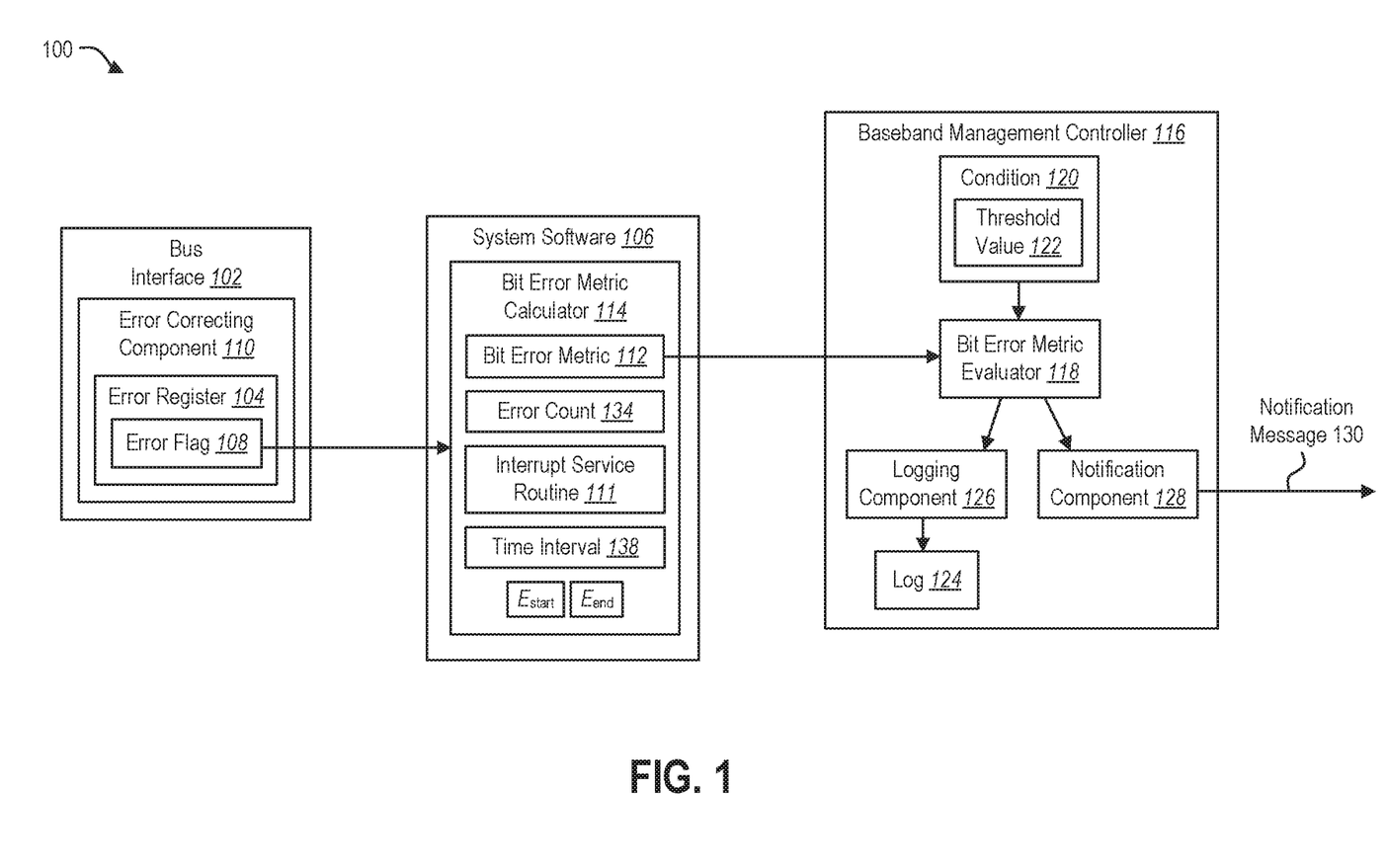
FIG. 1 illustrates aspects of a computer system that is configured to calculate and use a bit error metric in accordance with the techniques disclosed herein.

FIG. 1 illustrates aspects of a computer system 100 in accordance with the present disclosure. The computer system 100 includes a bus interface 102. The bus interface 102 includes an error correcting component 110. The error correcting component 110 includes an error register 104 that provides information about correctable errors.

Error information may refer to any information or data related to correctable errors. In the depicted example, the error information takes the form of an error flag 108 that is binary in nature. In other words, the error flag 108 has two possible values: a first value indicating that an error has occurred (an "error value"), and a second value indicating that an error has not occurred (a "non-error value"). When the bus interface 102 is initially placed into operation, the error flag 108 may be initialized to the non-error value. Whenever an error occurs, the error flag 108 may be changed to the error value. At some point thereafter (e.g., after the error has been appropriately handled), the error flag 108 may be changed back to the non-error value. As another example, as will be described in greater detail below, the error information may take the form of an error counter.

The computer system 100 includes system software 106. The system software 106 may be any software component (or group of software components) that performs the functions that are described herein in relation to the system software 106. For example, the system software 106 may be an operating system of the computer system 100, a basic input/output system (BIOS) of the computer system 100, firmware within the baseband management controller (BMC) 116, agent code running on the operating system of the computer system 100, or firmware or another operating system located on an add-in card or other subsystem of the computer system 100.

The system software 106 includes a component that uses the error flag 108 provided by the error register 104 to provide an error counter 134 for the bus interface 102, and that calculates a bit error metric 112 based on the error counter 134. This component may be referred to herein as a bit error metric calculator 114.

To provide the error counter 134, an interrupt service routine 111 may be utilized. The system software 106 may be configured to run the interrupt service routine 111 in response to a system interrupt being generated. The system interrupt may be generated when an error is detected. The system interrupt may be generated by the device that detects the error (e.g., the bus interface 102). In response to the system interrupt being generated, the interrupt service routine 111 may be configured to scan the bus interface 102 to determine the error status based on the error flag 108 in the error register 104. When the error flag 108 has the error value (indicating that an error has been detected), the interrupt service routine 111 may increment the error counter 134. Thus, the value of the error flag 108 may be captured asynchronously in order to update the error counter 134.

In some embodiments, the bit error metric 112 is a ratio of the number of bit errors that have occurred to the total number of bits that have been transferred. In implementations where the bit error metric 112 is defined in this manner, the bit error metric 112 may be determined with respect to a particular time interval 138. For example, determining the bit error metric 112 may involve determining both the number of bit errors that have occurred during a particular time interval 138, and also determining the total number of bits that have been transferred across the bus interface 102 during that time interval 138.

The time interval 138 over which the bit error metric 112 is determined may be a defined parameter within the computer system 100. In some embodiments, the time interval 138 may indicate how frequently the bit error metric 112 is determined. For example, if the time interval 138 is x seconds, the bit error metric 112 may be determined every x seconds. In such an embodiment, if the bit error metric 112 is determined at time t, then the bit error metric 112 may next be determined at time t+x. The bit error metric 112 at time t+x may be determined as a ratio of (i) the number of bit errors that have occurred between time t and time t+x, to (ii) the total number of bits that have been transferred across the bus interface 102 between time t and time t+x.

Certain information may be used in connection with determining the bit error metric 112. For example, the bit error metric calculator 114 may determine the total number of bits that have been transferred across the bus interface 102 during a particular time interval 138. This information may be obtained from the bus interface 102 itself. The total number of bits that have been transferred across the bus interface 102 during a particular time interval 138 may be calculated as the time interval (which is x in the example discussed above) multiplied by the data rate of the bus interface 102 (i.e., the maximum data rate at which the bus interface 102 is capable of transmitting data). This approach presumes that the bus interface 102 is not going into a low power state (where no data is transmitted) during any measured interval, and for many server systems this is a good assumption. Even if bus low power states are enabled, however, the risk is that the bit error metric 112 may err on the low side since the number of bits used in the calculation would always be greater or equal than the actual number of bits transmitted. Therefore, this approach is unlikely to register a false positive on exceeding a threshold. Although with this approach it is possible to miss logging or reacting to a real threshold violation, for various reasons the risk of this happening should be low.

Certain variables may also be used in connection with determining the bit error metric 112, including $E_{start}$ (the value of the error counter 134 at the start of a time interval 138) and $E_{end}$ (the value of the error counter 134 at the end of a time interval 138). These variables will be discussed in greater detail below in connection with the method 300 shown in FIG. 3.

The bit error metric 112 may be defined in other ways in accordance with the techniques disclosed herein. For example, in some embodiments, the bit error metric 112 may be defined as a ratio of the total number of bits that have been transferred to the number of bit errors that have occurred (i.e., the inverse of the definition provided above).

Alternatively, in some embodiments, the bit error metric 112 may be defined as the number of bit errors per unit time. In implementations where the bit error metric 112 is defined in this manner, determining the bit error metric 112 may simply involve determining the number of bit errors that have occurred during a particular time interval.

A baseboard management controller (BMC) 116 may be configured to obtain the bit error metric 112 from the system software 106. Alternatively, instead of obtaining the bit error metric 112 from the system software 106, the BMC 116 may calculate the bit error metric 112. For example, the system software 106 (e.g., the BIOS) may only be designed or capable of indicating one error at a time to the BMC 116, and the BMC 116 may be configured to keep a count of these reported errors as well as the time interval and the data rate to calculate the bit error metric 112. Although the system software 106 and the BMC 116 are separately in FIG. 1, in some cases the portion of the system software 106 that calculates the bit error metric 112 resides in the BMC 116, while the portion of the system software 106 that reports the data to calculate the bit error metric 112 resides elsewhere, such as in BIOS.

The BMC 116 may include a component that is configured to determine whether any action should be taken in response to the bit error metric 112. This component may be referred to herein as a bit error metric evaluator 118. In particular, the bit error metric evaluator 118 may be configured to determine whether a condition 120 that is related to the bit error metric 112 has been satisfied. In the depicted example, the condition 120 includes a threshold value 122, and the bit error metric evaluator 118 compares the bit error metric 112 to the threshold value 122. If the bit error metric 112 does not compare favorably to the threshold value 122, this means that some action should be taken.

The bit error metric 112 may compare favorably to the threshold value 122 by being above or below the threshold value 122, depending on the characteristics of the bit error metric 112. As indicated above, in some embodiments the bit error metric 112 may depend on both the number of bit errors that have occurred and the total number of bits that have been transferred. In embodiments where the value of the bit error metric 112 increases as the percentage of bit errors relative to the total number of transferred bits increases (e.g., if the bit error metric 112 is a ratio of the number of bit errors that have occurred to the total number of bits that have been transferred), then the bit error metric 112 compares favorably to the threshold value 122 by being below the threshold. However, in embodiments where the value of the bit error metric 112 decreases as the percentage of bit errors relative to the total number of transferred bits increases (e.g., if the bit error metric 112 is a ratio of the total number of bits that have been transferred to the number of bit errors that have occurred), then the bit error metric 112 compares favorably to the threshold value 122 by being above the threshold value 122.

If a condition 120 related to the bit error metric 112 is satisfied, then the BMC 116 may take one or more actions. There are many different types of actions that may be taken in accordance with the present disclosure. For example, the BMC 116 may include a logging component 126, and the bit error metric evaluator 118 may cause the logging component 126 to record an indication that the condition 120 has been satisfied. Other information, such as a timestamp (indicating the current date and time) may also be recorded in the log 124 along with the indication.

As another example, the BMC 116 may include a notification component 128. When a condition 120 related to the bit error metric 112 has been satisfied, the bit error metric evaluator 118 may cause the notification component 128 to send a notification message 130 to one or more other entities, which may be located within the computer system 100 or outside of the computer system 100. The notification message 130 may include the value of the bit error metric 112. Sending the notification message 130 to another entity allows that entity to track, analyze, and make decisions on appropriate actions.

Figure 1A:
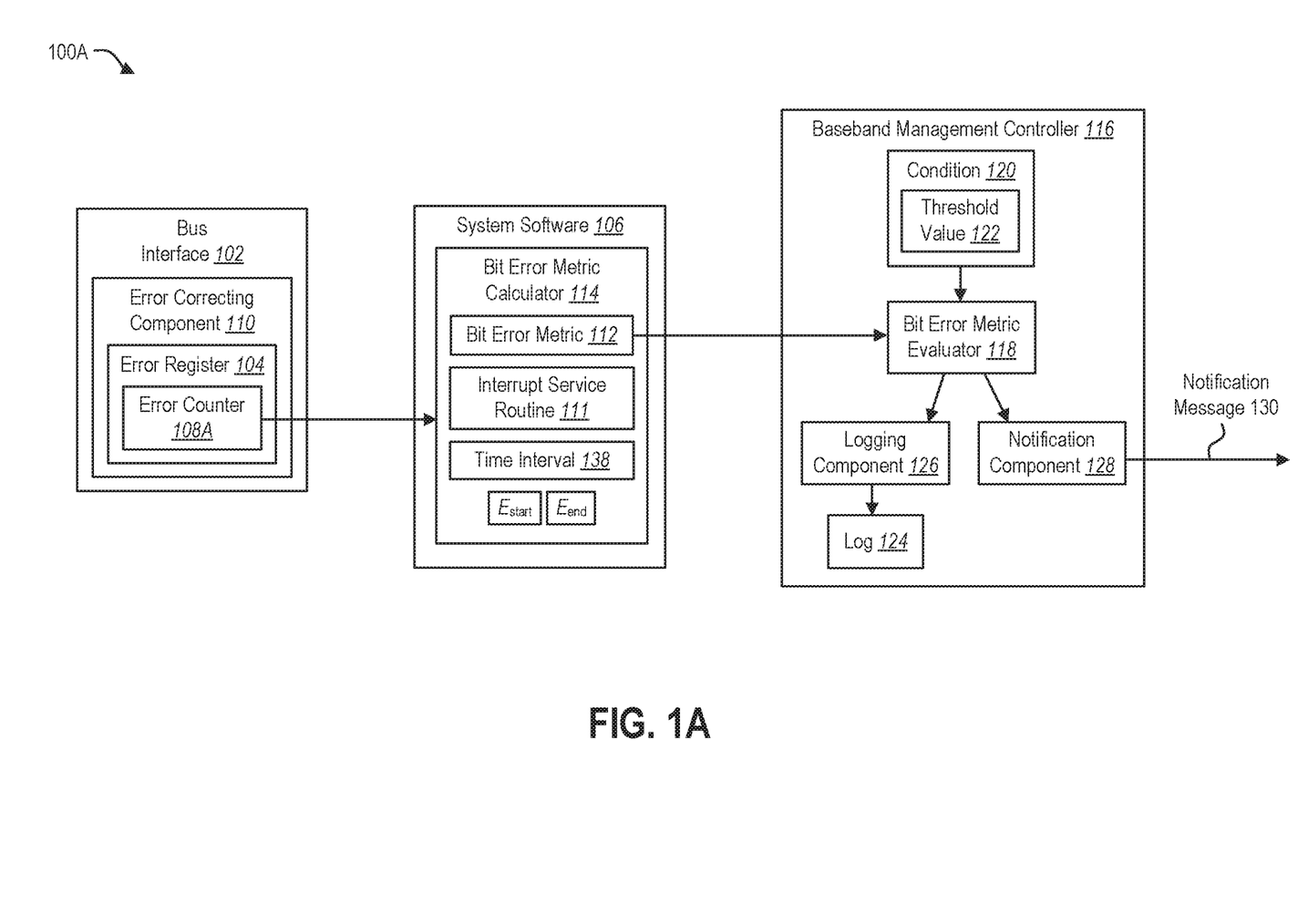
FIG. 1A illustrates aspects of a computer system in which the error information provided by the error register takes the form of an error counter.

FIG. 1A illustrates aspects of another computer system 100A in accordance with the present disclosure. The computer system 100A shown in FIG. 1A is similar in many respects to the computer system 100 shown in FIG. 1. However, in the computer system 100A shown in FIG. 1A, the error information provided by the error register 104 takes the form of an error counter 108A. The system software 106 may be configured to periodically poll the error register 104 to determine the current value of the error counter 108A.

In the embodiment shown in FIG. 1A, $E_{start}$ refers to the value of the error counter 108A at the start of a time interval 138, and $E_{end}$ refers to the value of the error counter 108A at the end of the time interval 138.

Figure 2:
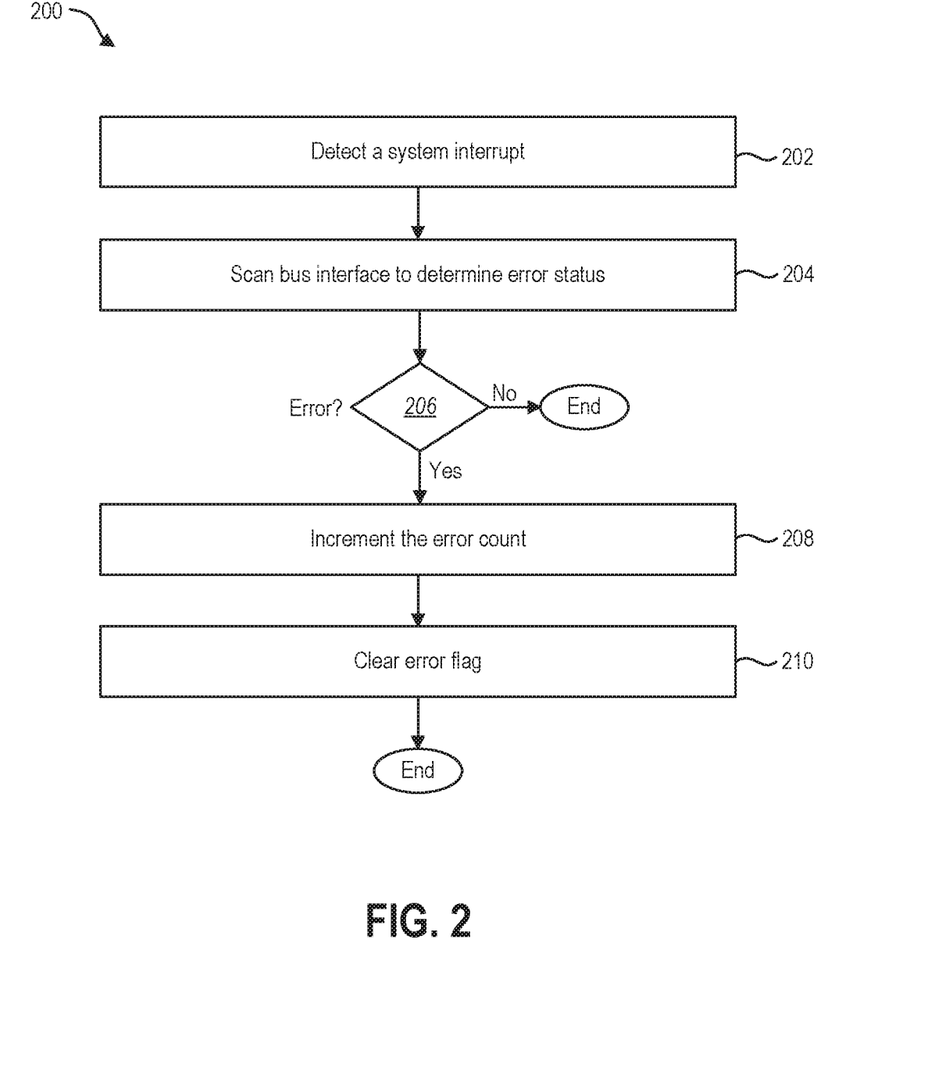
FIG. 2 illustrates an example of a method that may be performed in order to determine and maintain an error counter for a bus interface.

FIG. 2 illustrates an example of a method 200 that may be performed in order to provide the error counter 134 for the bus interface 102. The method 200 may be performed in connection with the embodiment shown in FIG. 1, in which the error information provided by the error register 104 takes the form of an error flag 108. The method 200 may be performed by the system software 106.

The method 200 begins when a system interrupt is detected 202. As indicated above, the system interrupt may be generated when an error is detected, and the system interrupt may be generated by the device that detects the error (e.g., the bus interface 102). In response to detecting 202 the system interrupt, the interrupt service routine 111 scans 204 the bus interface 102 to determine the error status based on the error flag 108 in the error register 104.

A determination is made 206 regarding whether the error flag 108 has the error value or the non-error value. If the error flag 108 has the non-error value, the method 200 ends. If, however, the error flag 108 has the error value, the error counter 134 is incremented 208, and the error flag may be cleared 210 in order to be ready for another error event. The method 200 then ends.

Figure 3:
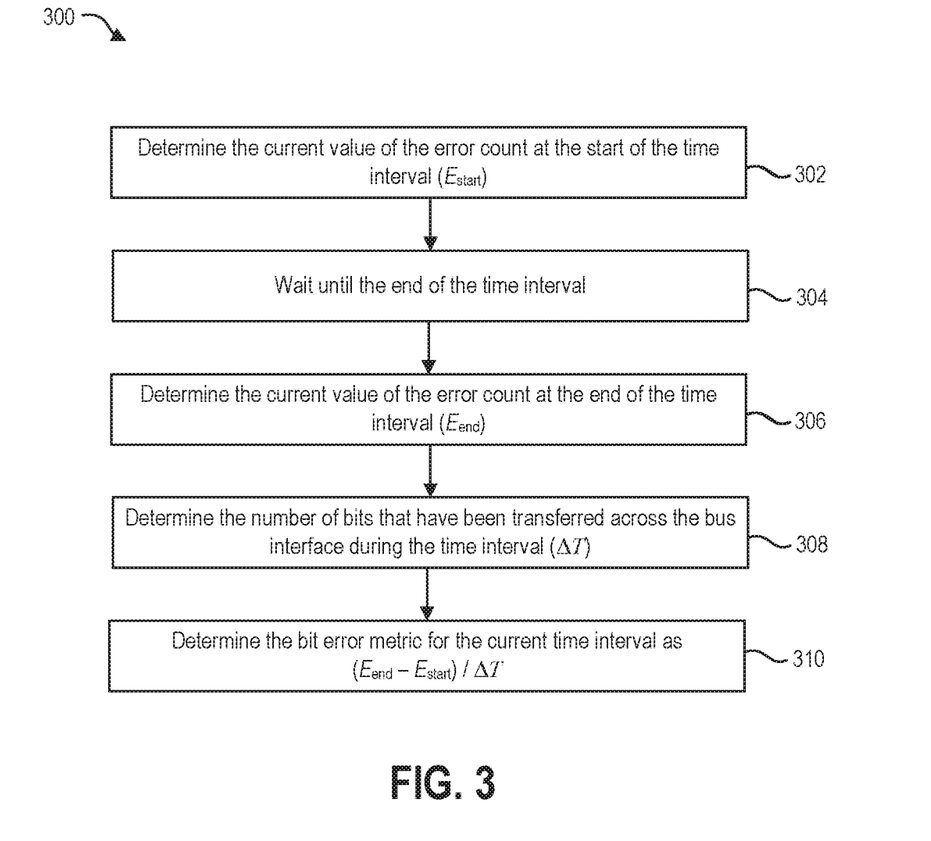
FIG. 3 illustrates an example of a method that may be performed in order to determine a bit error metric.

FIG. 3 illustrates an example of a method 300 that may be performed (e.g., by the bit error metric calculator 114) in order to determine the bit error metric 112. The method 300 may be performed in connection with the embodiment shown in FIG. 1 (in which the error information provided by the error register 104 takes the form of an error flag 108) or the embodiment shown in FIG. 1A (in which the error information provided by the error register 104 takes the form of an error counter 108A). In both embodiments, the value of an error counter is determined at different points in time. In the embodiment shown in FIG. 1, the error counter takes the form of the error counter 134 that is maintained by the system software 106 (and which may be determined and maintained in the manner described above in connection with FIG. 2). In the embodiment shown in FIG. 1A, the error counter takes the form of the error counter 108A that is part of the error register 104.

The method 300 includes determining 302, at the start of a time interval 138 during which the bit error metric 112 is determined, the current value of the error counter. This value may be referred to herein as $E_{start}$. If the method 300 is performed in connection with the embodiment shown in FIG. 1, determining 302 $E_{start}$ includes determining the current value of the error counter 134 that is maintained by the system software 106. If the method 300 is performed in connection with the embodiment shown in FIG. 1A, determining 302 $E_{start}$ includes polling the error register 104 to determine the current value of the error counter 108A.

The action of determining 302 $E_{start}$ may include initializing the error counter (e.g., the error counter 134 that is maintained by the system software 106 in the embodiment shown in FIG. 1, or the error counter 108A that is part of the error register 104 in the embodiment shown in FIG. 1A) to a known value, such as zero.

After waiting 304 until the end of the time interval 138, the method 300 then includes determining 306 the current value of the error counter at the end of the time interval 138. This value may be referred to herein as $E_{end}$. If the method 300 is performed in connection with the embodiment shown in FIG. 1, determining 306 $E_{end}$ includes determining the current value of the error counter 134 that is maintained by the system software 106 at the end of the time interval 138. If the method 300 is performed in connection with the embodiment shown in FIG. 1A, determining 306 $E_{end}$ includes polling the error register 104 to determine the current value of the error counter 108A at the end of the time interval 138.

The method 300 also includes determining 308 the number of bits that have been transferred across the bus interface 102 during the time interval 138. This value may be referred to as $\Delta T$. The bit error metric 112 for that time interval 138 may then be calculated 314 according to equation (1) below:

$$(E_{end} - E_{start})/\Delta T \tag{1}$$

In the embodiment shown in FIG. 1A, where the error counter 108A is part of the error register 104, the error counter 108A may be configured so that whenever an error occurs, the error counter 108A is incremented by a single value. When the error counter 108A reaches its maximum value, the error counter 108A can "roll over," meaning that the value of the error counter 108A can return to zero. For example, if the error counter 108A includes N bits, the maximum value of the error counter 108A may be represented as $2^N - 1$. If the value of the error counter 108A is $2^N-1$ and another error occurs, the value of the error counter 108A can "roll over" to zero (i.e., change from $2^N-1$ to zero). When taking the difference between $E_{end}$ and $E_{start}$, the possibility of roll over should be taken into consideration.

In the example shown in FIG. 1, the bit error metric 112 is compared to a single threshold value 122, and an action is taken if the bit error metric 112 exceeds the threshold value 122. Alternatively, in some implementations, multiple threshold values may be defined, and different actions may be taken depending on which threshold value has been crossed.

Figure 4:
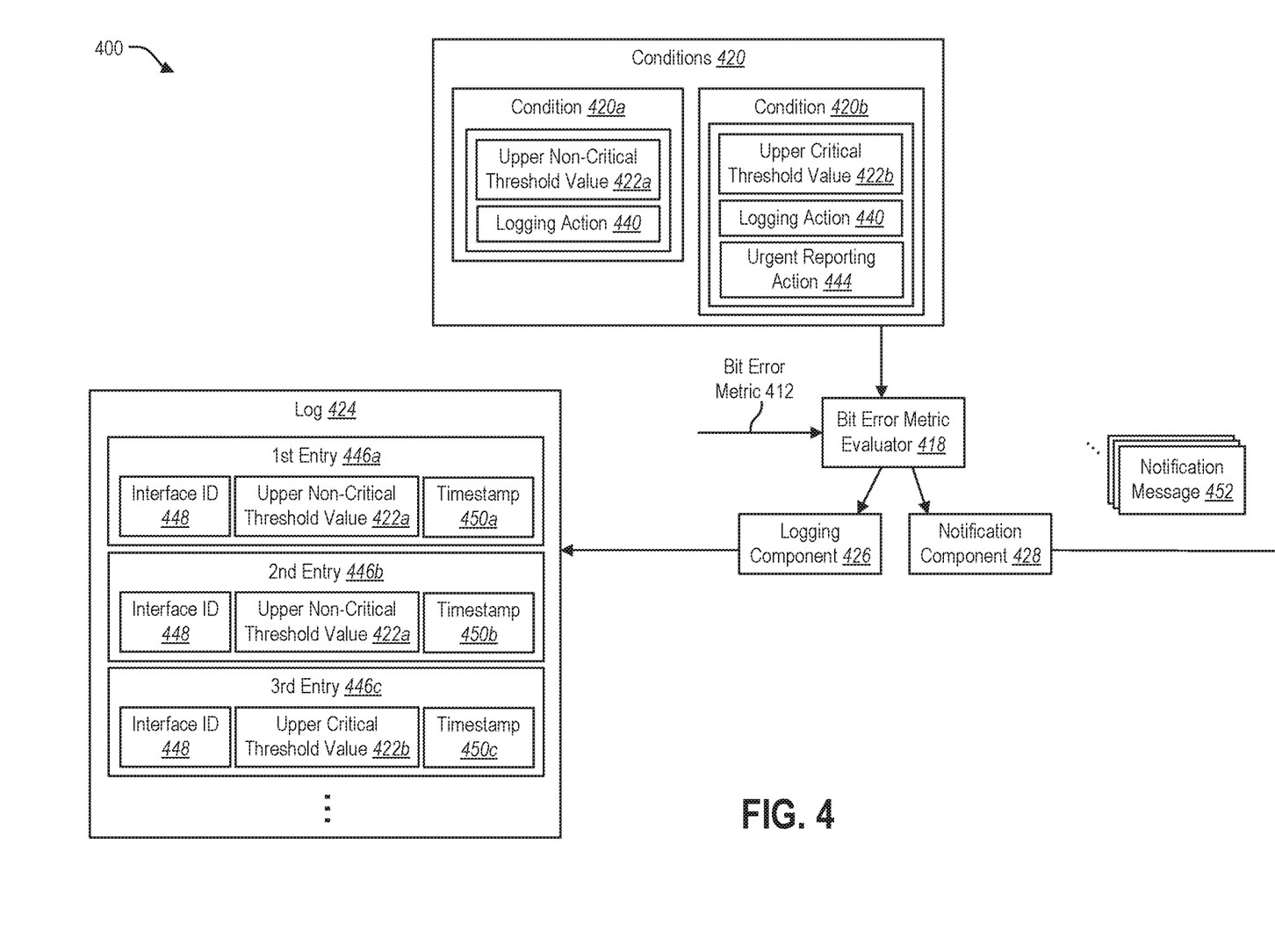
FIG. 4 illustrates aspects of a computer system that has defined multiple conditions related to a bit error metric.

FIG. 4 illustrates aspects of a computer system 400 that has defined multiple conditions 420 related to a bit error metric 412. The conditions 420 involve multiple threshold values 422a-b. In the depicted example, two threshold values 422a-b are defined: an upper non-critical threshold value 422a and an upper critical threshold value 422b. These threshold values 422a-b may be defined so that the upper critical threshold value 422b is higher than the upper non-critical threshold value 422a. Of course, the specific number of threshold values 422a-b in the depicted computer system 400 is provided for purposes of example only and should not be interpreted as limiting the scope of the present disclosure.

In addition to defining multiple threshold values 422a-b, the conditions 420 may also define one or more actions that should be taken when the bit error metric 412 does not compare favorably with one or more of the threshold values 422a-b. For example, a logging action 440 may be defined in connection with each of the threshold values 422a-b. This means that when the bit error metric 412 does not compare favorably with any of the threshold values 422a-b (e.g., when the bit error metric 412 exceeds any of the threshold values 422a-b), a logging component 426 may create an entry in a log 424.

FIG. 4 shows an example of a log 424 that may be created for a bus interface (such as the bus interface 102 shown in FIG. 1). The log 424 includes a plurality of entries 446a-c. Each of the entries 446a-c may correspond to a particular point in time when the bit error metric evaluator 418 receives a bit error metric 412 and compares the bit error metric 412 to the threshold values 422a-b that have been defined.

For purposes of the present example, it will be assumed that the bit error metric 412 does not compare favorably with a particular threshold value if the bit error metric 412 exceeds that threshold value.

A first entry 446a in the log 424 includes an interface ID 448 corresponding to the bus interface for which the bit error metric 412 has been calculated. The first entry 446a also includes an indication of the threshold value that has been crossed, which in this case is the upper non-critical threshold value 422a. The first entry 446a also includes a timestamp 450a. The timestamp 450a may correspond to the time when the first entry 446a is created, which should correspond reasonably closely to when the bit error metric 412 was determined that caused the creation of the first entry 446a. Optionally, each entry may include the actual value of the bit error metric in addition to the threshold value.

A second entry 446b in the log 424 also includes the interface ID 448 corresponding to the bus interface and an indication of the threshold value that has been crossed, which once again is the upper non-critical threshold value 422a. The second entry 446b also includes a timestamp 450b corresponding to the time when the second entry 446b is created.

A third entry 446c in the log 424 also includes the interface ID 448 corresponding to the bus interface and an indication of the threshold value that has been crossed, which in this case is the upper critical threshold value 422b. The third entry 446c also includes a timestamp 450c corresponding to the time when the third entry 446c is created. Log entries may be created both when a threshold is crossed indicating that the bit error metric compares unfavorably with the threshold, and again when the bit error metric again compares favorably to the metric. This may be indicated in another field of each log entry called an "assertion". If the assertion is true, then the threshold has been crossed in the positive direction indicating an unfavorable condition. If the assertion is false, then it indicates that the threshold has been crossed in the negative direction, indicating that the condition is again favorable.

In addition to the logging action 440, a reporting action may also be defined in connection with at least some of the threshold values. In the depicted example, no reporting action is defined in connection with the upper non-critical threshold value 422a. However, a reporting action 444 is defined in connection with the upper critical threshold value 422b. As part of the reporting action 444, a notification message 452 may be sent to one or more entities.

Figure 5:
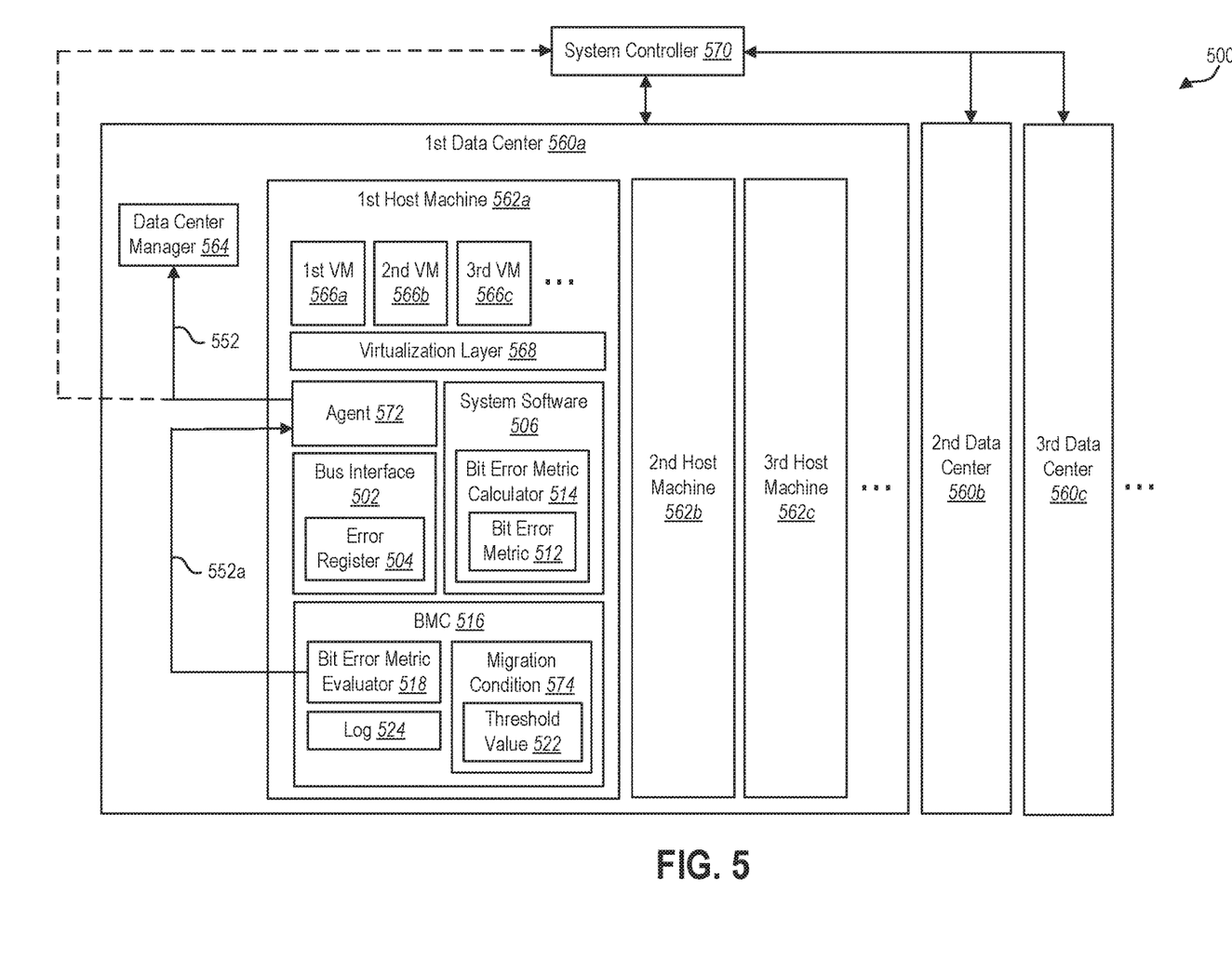
FIG. 5 illustrates an example of a cloud computing system in which the techniques disclosed herein may be utilized.

In some embodiments, the techniques disclosed herein may be implemented in the context of a cloud computing system. FIG. 5 illustrates an example of a cloud computing system 500 in which the techniques disclosed herein may be utilized. The system 500 includes a plurality of data centers 560a-c. The first data center 560a is shown with a plurality of host machines 562a-c and a data center manager 564. The host machines 562a-c may each be used to run zero or more virtual machines at any given time. In the depicted example, the first host machine 562a is shown with three virtual machines 566a-c. The first host machine 562a is also shown with a virtualization layer 568, which may alternatively be referred to as a hypervisor layer. The virtualization layer 568 may be configured to keep the virtual machines 566a-c isolated from one another on the first host machine 562a.

For simplicity, only three data centers 560a-c are shown in the system 500, and only three host machines 562a-c are shown in the first data center 560a. However, those skilled in the art will appreciate that a cloud computing system in accordance with the present disclosure may include more than three data centers, and a data center may include many more than three host machines (e.g., hundreds or thousands of host machines). Also, for simplicity, only the contents of the first data center 560a are shown in FIG. 5. However, the other data centers 560b-c may be configured similarly to the first data center 560a. In other words, the other data centers 560b-c may also include a data center manager and a plurality of host machines running zero or more virtual machines (as well as other components that are not shown in the simplified diagram of FIG. 5). Within the first data center 560a, only the contents of the first host machine 562a are shown in FIG. 5. However, the other host machines 562b-c may be configured similarly to the first host machine 562a.

The system 500 also includes a system controller 570 that is configured to manage the data centers 560a-c and the host machines 562a-c contained therein. To enable the system controller 570 to be able to perform various actions related to the host machines 562a-c in the system 500, each of the host machines 562a-c may include one or more agents that are configured to communicate with and perform various actions on behalf of the system controller 570. FIG. 5 shows an agent 572 on the first host machine 562a, and a similar agent may be running on the other host machines 562b-c.

The first host machine 562*a* includes a bus interface 502 that includes an error register 504. The error register 504 may be configured similarly to the error register 104 in the bus interface 102 shown in FIG. 1. For example, the error register 504 may provide information about correctable errors that have occurred on the bus interface 502. The error register 504 may take the form of a binary error flag that provides an error status, or an error counter.

The first host machine 562*a* also includes a bit error metric calculator 514, which may be implemented in system software 506 such as an operating system (OS) or a basic input/output system (BIOS) of the first host machine 562*a*. The bit error metric calculator 514 may be configured similarly to the bit error metric calculator 114 in the computer system 100 shown in FIG. 1. For example, the bit error metric calculator 514 may be configured to use whatever information is provided by the error register 504 (e.g., error status or an error counter) to calculate a bit error metric 512.

The first host machine 562*a* also includes a baseboard management controller (BMC) 516 that includes a bit error metric evaluator 518. The bit error metric evaluator 518 may be configured similarly to the bit error metric evaluator 118 in the BMC 116 shown in FIG. 1. For example, the bit error metric evaluator 518 may be configured to periodically obtain the bit error metric 512 from the system software 506 and determine whether one or more conditions related to the bit error metric 512 have been satisfied. The BMC 516 may take one or more actions in response to determining that a particular condition has been satisfied.

As indicated above, there are many different types of actions that may be taken in response to determining that a condition related to the bit error metric 512 has been satisfied, including recording an indication that the condition has been satisfied in a log 524 and/or notifying one or more other entities that the condition has been satisfied. In some embodiments, the BMC 516 may be configured to notify one or more entities outside of the first host machine 562*a* that the condition has been satisfied. For example, the BMC 516 may be configured to notify the data center manager 564 that the condition has been satisfied.

In some embodiments, a migration condition 574 related to the bit error metric 512 may be defined. The migration condition 574 may define the circumstances under which a particular host machine is in danger of a system crash, such that a workload on the host machine should be migrated to another host machine. In some embodiments, the migration condition 574 may be that the value of the bit error metric 512 does not compare favorably to a threshold value 522.

The BMC 516 may be configured to obtain the bit error metric 512 from the system software 506 (e.g., the BIOS and/or the OS of the first host machine 562*a*). In response to obtaining the current value of the bit error metric 512, the bit error metric evaluator 518 may be configured to evaluate the migration condition 574 based on the current value of the bit error metric 512. For example, the bit error metric evaluator 518 may be configured to determine whether or not the current value of the bit error metric 512 compares favorably to the threshold value 522. In response to determining that the migration condition 574 has been satisfied (e.g., that the current value of the bit error metric 512 does not compare favorably to the threshold value 522), the BMC 516 may send a notification message 552 to the data center manager 564. Sending a notification message 552 to the data center manager 564 may involve sending a notification message 552*a* to the agent 572 running on the first host machine 562*a*, which then forwards the notification message 552 to the data center manager 564. The data center manager 564 may interpret the receipt of the notification message 552 as an indication that the migration condition 574 has been satisfied. In response, the data center manager 564 may cause one or more workloads on the first host machine 562*a* to be migrated to another host machine (e.g., the second host machine 562*b*).

In this context, the term "workload" may refer to any set of instructions that is running on a computer system. For example, a workload may include one or more processes, applications, virtual machines, containers, or the like. In the context of the example that is shown in FIG. 5, a workload may include one or more of the virtual machines 566*a-c* that are running on the first host machine 562*a*.

In an alternative embodiment, the data center manager 564 may evaluate the migration condition 574 instead of (or possibly in addition to) the BMC 516. For example, the BMC 516 may send a notification message to the data center manager 564 that includes the value of the bit error metric 512. In response, the data center manager 564 may determine whether the migration condition 574 has been satisfied (e.g., by determining whether or not the current value of the bit error metric 512 compares favorably to the threshold value 522). If the migration condition 574 has been satisfied, the data center manager 564 may proceed to cause one or more workloads on the first host machine 562*a* to be migrated to another host machine.

In general, the data center manager 564 may be configured to receive a notification related to the bit error metric 512 and determine, based on the notification, whether the migration condition 574 has been satisfied. In some embodiments, the data center manager 564 may interpret the notification itself as an indication that the migration condition 574 has been satisfied. Alternatively, the notification may include the bit error metric 512, and the data center manager 564 may evaluate the migration condition 574 (based on the value of the bit error metric 512) to see whether or not the migration condition 574 has been satisfied.

In some embodiments, the actions described above in connection with the data center manager 564 may instead be performed by the system controller 570. In such embodiments, the notification message 552 may be sent to the system controller 570 instead of (or possibly in addition to) the data center manager 564.

The data center manager 564 and the system controller 570 shown in FIG. 5 are examples of entities that can be notified when a condition related to the bit error metric 512 is satisfied, and that can take one or more actions in response to such a notification. In accordance with the techniques disclosed herein, other entities besides the data center manager 564 and the system controller 570 may be notified instead of or in addition to the data center manager 564 and the system controller 570. For example, in some embodiments, a rack manager (i.e., an entity that manages a rack of servers within a data center) may be notified when a condition is satisfied that relates to a bit error metric corresponding to one of the servers in the rack.

In the examples described previously, a single value (e.g., the current value) of the bit error metric has been compared to one or more threshold values to determine whether one or more conditions have been satisfied. In some embodiments, however, conditions may be defined that involve historical information about the bit error metric. In other words, conditions may be defined that involve a determination about the value of the bit error metric over some period of time. For example, conditions may be defined that involve an analysis of trends related to the bit error metric.

Figure 6:
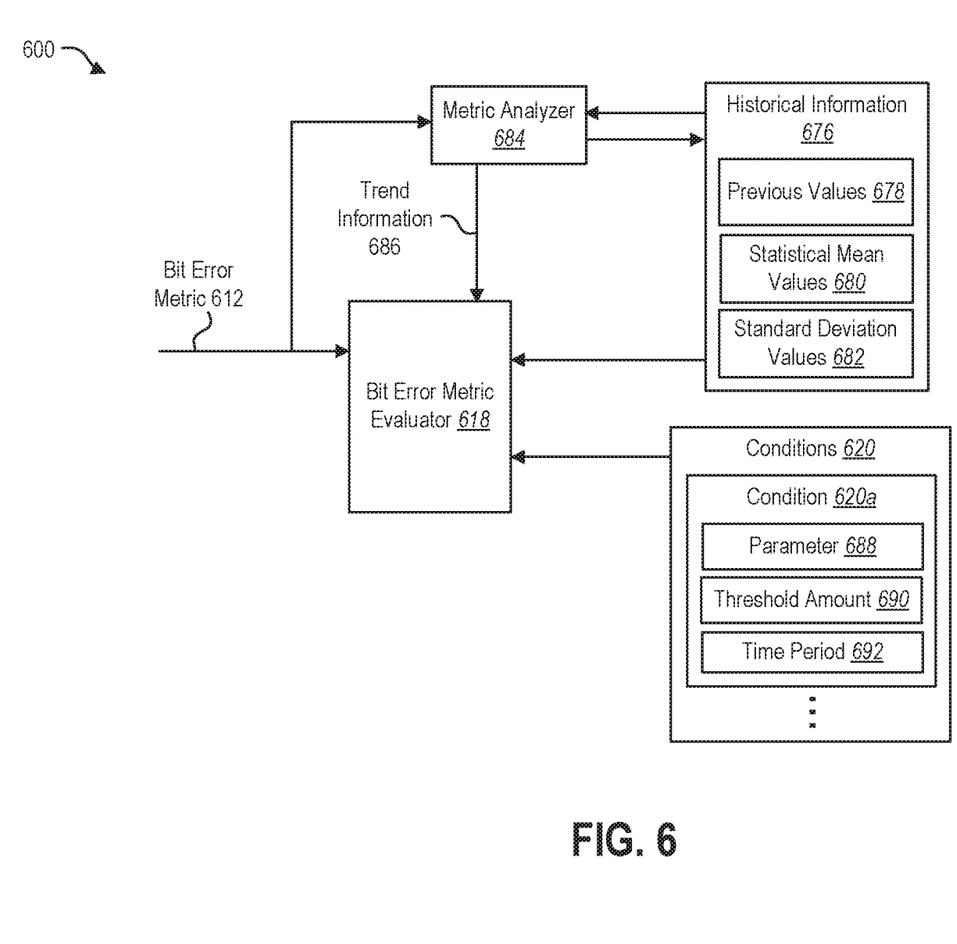
FIG. 6 illustrates aspects of a computer system in which historical information about the bit error metric is maintained.

FIG. 6 illustrates aspects of a computer system 600 in which historical information 676 about the bit error metric 612 is maintained. In the depicted example, the computer system 600 includes a component that maintains historical information 676 related to the bit error metric 612. This component may be referred to herein as a metric analyzer 684.

The historical information 676 may include previous values of the bit error metric 612 that have been determined over some period of time (e.g., the previous j days/weeks/months, where j may be a configurable parameter). These previous values may be referred to herein as historical bit error metric values 678. The historical information 676 may also include statistical parameters that have been calculated with respect to the historical bit error metric values 678, such as statistical mean values 680 and standard deviation values 682.

When a new value of the bit error metric 612 is produced, that value may be stored with the other historical bit error metric values 678. The metric analyzer 684 may, from time to time, calculate statistical parameters related to some or all of the historical bit error metric values 678.

A bit error metric evaluator 618 may periodically determine whether any conditions 620 that are related to the bit error metric 612 are satisfied. In some embodiments, the conditions 620 may depend at least in part on historical information 676 related to the bit error metric 612, either instead of or in addition to depending on the current value of the bit error metric 612.

The metric analyzer 684 may analyze trends in the historical bit error metric values 678 and/or statistical parameters related to the historical bit error metric values 678, such as the statistical mean values 680 and standard deviation values 682. The metric analyzer 684 may provide information about trends in these values to the bit error metric evaluator 618. Such trend information 686 may be used to determine whether one or more actions should be performed. For example, if the trend information 686 indicates that failure of a bus interface is likely to occur fairly soon, one or more other entities may be notified so that preventative action can be taken.

In some embodiments, a condition 620a may be defined that is related to a change in a particular statistical parameter 688 (e.g., the statistical mean, the standard deviation) related to historical bit error metric values 678. For example, the condition 620a may specify that one or more actions should be taken if a statistical parameter 688 related to historical bit error metric values 678 has changed by more than a threshold amount 690 within a defined time period 692 (assuming that the change indicates the presence of more errors).

In some embodiments, the components and functionality described above in connection with FIG. 6 may be implemented within a baseboard management controller (BMC). Alternatively, the components and functionality described above in connection with FIG. 6 may be implemented within another entity, such as a data center manager or system controller. In general, any entity that determines whether a condition related to the bit error metric has been satisfied may include the components and functionality described above in connection with FIG. 6.

For the sake of simplicity and clarity, some aspects of the present disclosure have been described in relation to a single bus interface. However, the techniques disclosed herein are applicable to a computer system that includes a plurality of bus interfaces. In such a computer system, a bit error metric may be determined for a plurality of bus interfaces in the system.

As noted above, examples of bus interfaces include Peripheral Component Interconnect Express (PCIe), Ultra Path Interconnect (UPI), Quick Path Interconnect (QPI), XGMI, XGMI2, any computer bus that operates using a double data rate (DDR) technique, Ethernet, Serial AT Attachment (SATA), and Serial Attached Small Computer System Interface (SAS).

PCIe is a high-speed serial computer expansion bus standard. It is typically used as a motherboard interface for various components in a computer system, such as graphics cards, hard drives, solid-state drives (SSDs), wireless communication interfaces (e.g., interfaces that support an IEEE 802.11 standard, also known as Wi-Fi), and wired communication interfaces (e.g., Ethernet). A PCIe system includes a processor and memory, a switch fabric including one or more switch devices, and a root complex device that connects the processor and memory to the switch fabric. PCIe endpoints (i.e., devices that are connected to the computer system through the PCIe system) may be connected to the root complex device and/or to the switch fabric.

UPI and QPI are high-speed, point-to-point interconnects used in certain processors developed by Intel Corporation. UPI and QPI provide high-speed, point-to-point links inside and outside of a processor. These links facilitate data transfers by connecting components within a processor such as distributed shared memory, internal processor cores, an I/O hub, etc. UPI and QPI links within a processor may also provide connections to other processors.

XGMI and XGMI2 are interconnects developed by Advanced Micro Devices, Inc. XGMI and XGMI2 are typically used for connecting graphics processing units (GPUs). They enable GPU clustering for increased processing power.

A computer bus operating with DDR transfers data on both the rising and falling edges of the clock signal. This technique has been used for various systems with high data transfer speed requirements, including microprocessor front side buses, processor interconnects, main memory, and graphics memory.

SATA and SAS are computer bus interfaces that are typically used to connect host bus adapters to mass storage devices such as hard disk drives, SSDs, and optical drives.

Ethernet is a family of networking technologies commonly used in computer networks including local area networks (LANs). Unshielded twisted pair (UTP) cables and coaxial cables are commonly used in Ethernet LANs. Current Ethernet networks are capable of achieving data transfer rates as fast as hundreds of gigabits per second.

Some aspects of the present disclosure involve a computer system's Basic Input/Output System (BIOS) and/or operating system (OS). The BIOS is non-volatile firmware in computer systems. The BIOS performs hardware initialization during the process of booting (or starting up) a computer system. In typical operation, the BIOS initializes and tests the system hardware components, and then loads a boot loader from a mass memory device, which initializes an operating system. The BIOS may also be referred to as a Unified Extensible Firmware Interface (UEFI). The operating system (OS) is system software that manages computer hardware and software resources and provides common services for computer programs.

Some aspects of the present disclosure involve a baseboard management controller (BMC), which is a specialized microcontroller embedded on the motherboard of a computer system. Different types of sensors built into the computer system report to the BMC on parameters such as temperature, cooling fan speeds, power status, operating system (OS) status, etc. The BMC monitors the sensors and can send alerts to another entity (e.g., another computer system operated by a system administrator) if any of the parameters do not stay within pre-set limits. An administrator can also remotely communicate with the BMC to take some corrective actions, such as resetting or power cycling the system.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

A processor may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. A processor may be referred to as a central processing unit (CPU).

Memory, as used herein, may be any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

Instructions and data may be stored in memory. The instructions may be executable by a processor to implement some or all of the methods, steps, operations, actions, or other functionality that is disclosed herein. Executing the instructions may involve the use of the data that is stored in the memory. Unless otherwise specified, any of the various examples of modules and components described herein may be implemented, partially or wholly, as instructions stored in memory and executed by one or more processors. Any of the various examples of data described herein may be among the data that is stored in memory and used during execution of the instructions by the processor.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer system, comprising:
a bus interface having error correction capability;
an error register within the bus interface, wherein the error register is configured to provide error information related to correctable errors;
system software that is configured to obtain the error information from the error register; and
a baseboard management controller (BMC) that is configured to take an action in response to determining that a condition related to a bit error metric has been satisfied, wherein the bit error metric is calculated based on the error information and the bit error metric comprises a ratio of a number of correctable bit errors that have occurred during a time interval to a total number of bits that have been transferred across the bus interface during the time interval.

2. The computer system of claim 1, wherein:
the error register is configured to provide an error status of the bus interface; and
the system software is configured to run an interrupt service routine in response to an interrupt being generated, the interrupt service routine being configured to scan the bus interface to determine the error status and increment a counter when the error status indicates that a correctable error has occurred.

3. The computer system of claim 1, wherein:
the error register is configured to provide an error counter for the bus interface; and
the system software is configured to periodically poll the error register to determine a current value of the error counter.

4. The computer system of claim 1, wherein the system software is selected from the group consisting of a host operating system of the computer system, a basic input/output system (BIOS), BMC firmware, agent code running on the host operating system, or firmware or another operating system located on an add-in card or other subsystem of the computer system.

5. The computer system of claim 1, wherein the action comprises at least one of:
logging an indication that the condition related to the bit error metric has been satisfied;

notifying an entity that the condition related to the bit error metric has been satisfied; or directly supplying the bit error metric to the entity.

6. The computer system of claim 1, wherein determining that the condition has been satisfied comprises determining that the bit error metric does not compare favorably to a threshold value.

7. The computer system of claim 1, wherein a plurality of threshold values are defined, and wherein the BMC is configured to:

take a first action in response to determining that the bit error metric does not compare favorably to a first threshold value; and take a second action in response to determining that the bit error metric does not compare favorably to a second threshold value, wherein the second action is different from the first action.

8. The computer system of claim 1, wherein determining that the condition has been satisfied comprises detecting that a statistical parameter related to historical bit error metric values has changed by more than a threshold amount within a defined time period.

9. The computer system of claim 1, wherein:

calculating the bit error metric comprises calculating a ratio of $(E_{end}-E_{start})/\Delta T$; $E_{start}$ indicates a first error counter value at a start of a time interval;

$E_{end}$ indicates a second error counter value at an end of the time interval; and $\Delta T$ indicates the total number of bits that have been transferred across the bus interface during the time interval.

10. A baseboard management controller (BMC) for a computer system, comprising:

one or more processors;

memory in electronic communication with the one or more processors; and instructions stored in the memory, the instructions being executable by the one or more processors to:

determine that a condition related to a bit error metric has been satisfied, wherein the bit error metric is related to a bus interface within a computer system, wherein the bus interface comprises error detection and correction capability, and wherein the bit error metric comprises a ratio of a number of correctable bit errors that have occurred on the bus interface during a time interval to a total number of bits that have been transferred across the bus interface during the time interval; and take an action in response to determining that the condition has been satisfied.

11. The baseboard management controller of claim 10, wherein the bit error metric is:

obtained from a process that is running within an operating system (OS) or a basic input/output system (BIOS); or generated by the BMC based on error data obtained from the OS or the BIOS.

12. The baseboard management controller of claim 10, wherein the action comprises:

recording a current value of the bit error metric in a log; or sending a notification message to another entity.

13. The baseboard management controller of claim 10, wherein determining that the condition has been satisfied comprises determining that the bit error metric does not compare favorably to a threshold value.

14. The baseboard management controller of claim 10, further comprising additional instructions that are executable by the one or more processors to:

take a first action in response to determining that the bit error metric does not compare favorably to a first threshold value; and take a second action in response to determining that the bit error metric does not compare favorably to a second threshold value, wherein the second action is different from the first action.

15. A computer-implemented method, comprising:

receiving a notification related to a bit error metric for a bus interface within a computer system, wherein the bus interface comprises error correction capability, and wherein the bit error metric comprises a ratio of a number of correctable bit errors that have occurred on the bus interface during a time interval to a total number of bits that have been transferred across the bus interface during the time interval;

determining, based on the notification, that a condition related to the bit error metric has been satisfied; and taking an action in response to determining that the condition has been satisfied.

16. The method of claim 15, wherein:

the condition comprises a migration condition indicating that the computer system is likely to experience a system crash;

the computer system comprises a workload; and the action comprises causing the workload to be migrated to a different computer system.

17. The method of claim 15, wherein determining that the condition has been satisfied comprises interpreting the notification as an indication that the migration condition has been satisfied.

18. The method of claim 15, wherein the notification comprises the bit error metric, and wherein determining that the condition has been satisfied comprises determining that the bit error metric does not compare favorably to a threshold value.

* * * * *